United States Patent [19]

Penalver

[11] Patent Number: 5,060,257
[45] Date of Patent: Oct. 22, 1991

[54] VIDEOTEX TERMINAL FOR RECEIVING TELECOPIES

[75] Inventor: Georges Penalver, Conflans Sainte Honorine, France

[73] Assignee: Societe D'Applications Generales D'Electricite et de Mecanique Sagem, Paris, France

[21] Appl. No.: 507,207

[22] Filed: Apr. 11, 1990

[30] Foreign Application Priority Data

Apr. 13, 1989 [FR] France .................................. 89 04895
Jul. 18, 1989 [FR] France .................................. 89 09613

[51] Int. Cl.⁵ .......................................... H04M 11/00
[52] U.S. Cl. ...................................... 379/100; 379/98; 379/96
[58] Field of Search ............... 379/96, 98, 100; 375/7, 375/8

[56] References Cited

U.S. PATENT DOCUMENTS

| | | | |
|---|---|---|---|
| 4,496,943 | 1/1985 | Greenblatt | 379/96 |
| 4,581,484 | 4/1986 | Bendig | 379/96 |
| 4,600,808 | 7/1986 | Cosentino et al. | 379/96 |
| 4,707,849 | 11/1987 | Rault et al. | 379/96 |
| 4,739,402 | 4/1988 | Maeda et al. | 379/96 |
| 4,814,972 | 3/1989 | Winter et al. | 379/95 |
| 4,896,347 | 1/1990 | Auber | 379/96 |
| 4,910,506 | 3/1990 | Yoshida et al. | 379/100 |

FOREIGN PATENT DOCUMENTS

0222919A1 5/1987 European Pat. Off. .
2169174A 7/1986 United Kingdom .

OTHER PUBLICATIONS

Electrical Communication, vol. 62, Nov. 2, 1988, pp. 184+, "Videotex Access Point DPV105" by M. Fournier.
British Telecommunication Engineering, vol. 5, Jan. 87, pp. 273-275, Merlin Tonto.
Communication & Transmission No. 2—1987, "The Agora Telematic Terminal", pp. 57+.
Communication & Transmission, vol. 9, No. 2, 1987, pp. 57-60, Paris, France.
Patent Abstracts of Japan, vol. 6, No. 238 (E-144)(1116), Nov. 26, 1982.

Primary Examiner—Jin F. Ng
Assistant Examiner—Ahmad F. Matar
Attorney, Agent, or Firm—Lowe, Price, LeBlanc and Becker

[57] ABSTRACT

A videotex terminal capable of receiving telecopies is disclosed, comprising a printing device at the output of its modem for printing fixed images in response to graphic data from a source connected to the telephone network, and the procedure for communicating the graphic data comprises protocol phases, during which the terminal and the source exchange questions and answers in the form of data transmitted at a first speed via the modem used alternately in one direction and in the other, and transfer phases, during which a flow of graphic data is transmitted by the modem, at this first speed, from the source to the terminal and data for regulating said flow are transmitted by the modem, at a second speed, from the terminal to the source.

9 Claims, 3 Drawing Sheets

VIDEOTEX TERMINAL FOR RECEIVING TELECOPIES

BACKGROUND OF THE INVENTION

The present invention relates to a videotex terminal which can be connected to a telephone network for asking for and receiving pages of characters from a server center also connected to the network, and comprising:
a control keyboard,
a display screen, and
a modem with an input connected to the keyboard, an output connected to the screen and a bidirectional access connected to a telephone line of said network, said modem being normally provided for transmitting data from said center at a first speed and data towards said center at a second speed.

Such a terminal, well known in France under the name of "Minitel" makes it possible particularly for private persons or enterprises to have access to all sorts of information contained in data banks to which the server centers may be connected, or else access to a number of services able to be rendered by these server centers.

The information which the user of such a terminal receives on his screen is in the form of pages of characters, it being understood that by "character" is meant here not only the conventional alphanumeric characters but also a certain number of symbols for causing certain simple graphisms to appear on the screen. These symbols are limited in number and in fact are processed like alphanumeric characters, i.e. each of them is coded before transmission, for example in the form of a group of 7 binary elements or bits, this group of bits being decoded after transmission and restored to the screen in the form of the corresponding symbol. Considering the limited number of such symbols, it is obvious that the graphisms which may thus be restored are summary, as any user of a "Minitel" has realized. For this reason, these symbols are often termed "semi-graphic".

If the user of such a "Minitel" terminal desires to keep a copy of the information displayed on the screen, he may connect, on the socket provided on the terminal for the connection of peripheral type equipment, printer capable of recopying the screen. Naturally, the graphisms thus printed are strictly identical to those appearing on the screen, the printer being adapted, at the output of the modem, for converting groups of 7 bits into characters and semi-graphic symbols to be printed.

The data communication procedure provides for the modem being bidirectional, the modulation speed allowing simultaneous exchanges at a speed $V_1$ in one direction and at a lower speed $V_2$ in the other direction. The data from the server center, which is normally the most numerous, is thus transmitted at speed $V_1$ which is equal to 1200 bauds, whereas the data transmitted by the "Minitel" terminal towards the server center, which is normally simple control data, is transmitted at the speed $V_2$ which is equal to 75 bauds. In some cases, it is possible to "reverse" the modem, for using speed $V_2$ at reception and speed $V_1$ at transmission. The data transmitted is generally in groups of 7 bits of useful information, in synchronous mode, 10 bits in all being required per group of 7 useful bits. In fact, a group of 7 useful bits is preceded by a synchronization or start bit and followed by a parity bit and a stop bit.

Furthermore, so that private persons and enterprises can exchange veritable graphic information such as a manuscript document, an explanatory diagram, a constructional plan or any other fixed image, there exist telecopying apparatus or telecopiers.

In a telecopier used for transmission, the document comprising the image to be transmitted is analyzed finely so that each of its image elements, or pixels, is individually coded. After compression of the information resulting from such analysis, the corresponding data, which may be veritably termed "graphic data" is transmitted via a modem over the telephone network, to another telecopier used for reception. The latter is provided, at the output of its own modem, with a circuit for receiving such graphic data which in particular decompresses it and decodes it and controls a printer, for example a thermal printer, which restores the original image, with very good resolution, at the present time 8 points per millimeter, for example.

The telecopy communication procedure comprises, for each dispatch, protocol phases which enclose the transfer phase during which a flow of graphic data is transmitted from the transmitting telecopier to the receiving telecopier. During the protocol phases, simultaneous exchanges are provided for in both directions at the same speed of 300 bauds. During the first protocol procedure which precedes the transfer properly speaking, the communicating telecopiers exchange in particular data relative to their identifications and their respective possibilities. They also proceed with training which allows them to evaluate, considering the quality of the telephone line which connects them together, the maximum speed at which the transfer may take place, this speed being for example 2400, 4800, 7200 or 9600 bauds at the present time.

After the transfer phase which takes place, in synchronous mode, at the speed determined during training, a second protocol phase takes place which makes possible in particular the transmission of an acknowledgement and freeing of the line. The performances of modems used in telecopiers are therefore adapted for providing the preceding functions.

At the present time a private person or an enterprise which desires to keep a written copy of the information received via videotex and who desires to be able to receive from some of his correspondents documents of graphic quality must then be equipped both with a "Minitel" terminal having a screen recopying printer and a telecopier. Such an installation is of a relatively high cost price. In addition, if this user only has a single telephone line for receiving calls relative to telephone conversations and those relative to telecopies, he can only receive telecopies if a person is present near the telephone set at the moment when it rings, for manually connecting the telephone line to the telecopier if the call is relative to the transmission of a telecopy. Finally, if this user needs graphic data of a certain quality, so not capable of being restored by the "Minitel" screen and by the screen recopying printer and which is held in a data bank, he must request, during a telephone conversation with an operator of this data bank or possibly during a "Minitel" exchange, for this data bank to call him back to send him such graphic data by telecopy. In both cases, he must interrupt his communication, free the line and wait for the call from the data bank for connecting his telecopier. Such a procedure is particularly inconvenient, both for the user and the data bank.

SUMMARY OF THE INVENTION

The object of the invention is in particular to overcome the above drawbacks.

For this, it provides a videotex terminal of the above defined type, characterized by the fact that:

it comprises means, connected to the output of said modem, for printing fixed images in response to first graphic data from a source such as a graphic server center or a telecopier connected to said network, and the procedure for communicating said first graphic data comprises protocol phases during which said terminal and said source exchange questions and answers in the form of data transmitted at said first speed via the modem used alternately in one direction and in the other, and transfer phases, during which a flow of first graphic data is transmitted by said modem, at said first speed, from the source to said terminal and data from said terminal to said source for regulating said flow is transmitted by said modem, at said second speed.

In the terminal of the invention, the communication procedure provided for the graphic data transfer means that the modem normally provided for the transmission of data relative to alphanumeric or semi-graphic characters also serves for transmitting such graphic data, which is of the same type as that usually transmitted in telecopying, but using a different procedure. A first advantage results therefrom relative to the reduction of the cost price of the preceding installation, since in particular it only uses a single modem and single associated line equipment instead of two.

However, the terminal of the invention has another important advantage, relative to the fact that during a single exchange, often called session by a man skilled in the art, it makes it possible to request a data bank, via the keyboard and the usual videotex controls, the dispatch of truly graphic data, for restoring it by printing means. The quality of such restoration may be very good, if the printing means comprises for example a thermal printer of the same type as that used at the present time in telecopiers. Such a data bank, capable of delivering veritable graphic data will be accessible by a server center called hereafter graphic server center.

The simplicity of such a procedure and possible automation thereof in so far as the data bank is concerned appreciably increase the field of data and services which can be offered by the server centers. Thus, maps, and geographical plans, musical scores, plans of flats, texts in a non latin alphabet, mathematical formulae, molecular structures . . . may thus be transmitted. The data transmitted may result from an analysis made by an adapted telecopier, of documents representing the images to be transmitted, but they may also be generated directly by a data processing system, which obviously gives an even better image quality than that known at the present time for telecopiers, since degradation related to the analysis of the starting documents is thus avoided.

In a first embodiment, the following are provided:

means for detecting a call, disposed in said telephone line, means for connecting said telephone line to said modem access, in response to a detected call, alarm means, and means, connected to the output of said modem, for detecting a first graphic data transmission request, and for controlling, in the case of a first graphic data transmission request, said printing means and, in the absence of detection of a first graphic data transmission request, said alarm means.

In this case, the terminal responds automatically to the calls and a telecopy may be received without manual intervention and without the user having to give up the possibility of receiving calls relative to simple telephone conversations.

Advantageously, means are provided connected to said modem output for converting into graphic data data representing characters to be displayed on said screen and for controlling said printing device so that it restores a copy of said screen in response to the converted data.

In this case, the printer makes possible both the restoration of documents or images transmitted by telecopier and recopying of the pages of characters of semi-graphic symbols appearing on the screen in videotex mode.

Again advantageously, means are provided for analyzing fixed images, having an output connected to said modem input and delivering second graphic data for transmitting said second graphic data for remotely restoring fixed analyzed images and the procedure for communicating said second graphic data is identical to that of said first graphic data, with reversal of the direction of said modem.

In this case, the terminal, in addition to its videotex terminal functions, has functions identical to that of a telecopier, since it makes it possible to transmit telecopies as well as to receive them.

Again advantageously, switching means are provided for switching off the electric power supply to said terminal during the rest periods of said terminal, except for said call detection means and said switching means are controlled by said call detection means for reestablishing the electric power supply in response to a call detection.

Such a terminal is therefore particularly economic in electric power consumption, while remaining capable of receiving and processing the calls arriving over the line, even in the absence of any user.

In the first embodiment which has just been described, the terminal however requires the intervention of the user for receiving pages of videotex type characters. In addition, it is not possible to transmit such pages of characters remotely to a correspondent who does not have a telecopier.

This is why a second embodiment has been provided which offers such possibilities.

In the second embodiment, the terminal comprises:

call detection means, disposed in said telephone line, means for connecting said telephone line to said modem access, in response to a detected call, means, connected to the output of said modem, for detecting a first graphic data transmission request and controlling, in the case of a first graphic data transmission request, said printing device so that it prints said first graphic data, alarm means, and means connected to the output of said modem for, in the absence of a first graphic data transmission request, detecting a request for transmission of pages of characters and controlling, in the case of a request for the transmission of pages of characters, means for receiving these pages of characters and for controlling said alarm means in the absence of a request for the transmission of pages of characters.

The terminal responds automatically to each call and, whatever the origin of this call, telecopier, videotex server or simply another person, this call is routed suitably without manual intervention and without the user having to give up the possibility of receiving calls relative to simple telephone conversations.

Advantageously, said means for receiving pages of characters comprise said printing device.

In this case, the terminal of the invention makes automatic delivery of the data transmitted by videotex server possible.

Advantageously again, means are provided, connected to the output of said modem, for converting into graphic data data representing characters to be displayed on said screen and for transmitting said graphic data for remote restoration of said characters.

In this case, the terminal makes it possible to transmit pages of characters of semi-graphic symbols of videotex type, in the form of graphic data, directly to another telecopier, for example. Such transmission is of very good quality, to the extent that the graphic data transmitted does not result, as is usual, from optical scanning analysis of one or more documents, but only undergoes data processing which does not degrade the quality thereof.

BRIEF DESCRIPTION OF THE DRAWINGS

The present invention will be better understood from the following description of two preferred embodiments of the terminal of the invention, with reference to the accompanying drawings in which.

DESCRIPTION OF THE PREFERRED EMBODIMENTS

Figure 1:
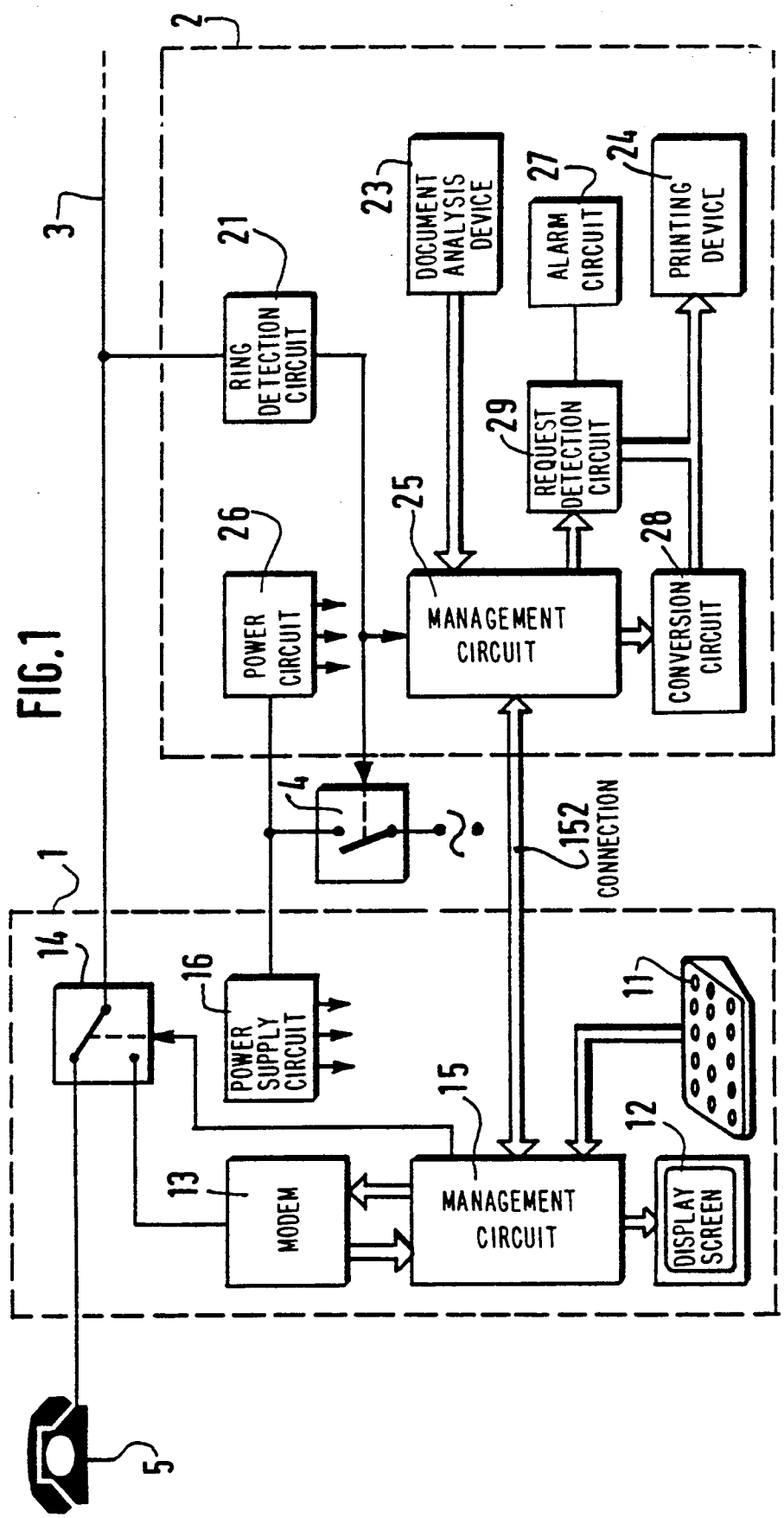
FIG. 1 is a block diagram of the first embodiment of the terminal of the invention.

Referring to FIG. 1, a videotex terminal of "Minitel" type for receiving and transmitting documents by telecopier will now be described.

This terminal comprises, in a way known per se, a controllable change-over switch 14 having a fixed contact connected to a telephone line 3 and two mobile contacts one of which is connected to a telephone handset 5 so that the subscriber using the line 3 can make a connection with another subscriber for a normal telephone conversation or connection with a server center, not shown, but also connected to the telephone network to which line 3 belongs, for an exchange or session with this server center through the "Minitel" terminal. Line 3 is here a line of the switched telephone network and the signals it transports are therefore analog signals.

The second mobile contact of change-over switch 14 is connected to the bidirectional analog access of a modem 13. The modem 13, or modulator-demodulator, is a well known circuit in the art which, in addition to its bidirectional access already mentioned, has a digital input and digital output here connected to a management circuit 15. Modem 13 is adapted for modulating, depending on the digital data at its digital input, an analog signal transmitted over line 3 via its bidirectional access and, conversely, for demodulating any analog signal at its bidirectional access for restoring, at its digital output, the digital data modulating this analog signal.

The management circuit 15 has a digital input connected to a control keyboard 11, a digital output connected to a display screen 12 and a binary output connected to the control input of the change-over switch 14. The management circuit 15 also has a bidirectional digital access connected to a connection 152.

A circuit 16 for the electric power supply of modem 13, screen 12, keyboard 11 and the management circuit 15 is connected via a controllable switch 4, to the mains network, e.g. 220V–50Hz. For the sake of simplicity, the connections between circuit 16 and the circuits it supplies have not been shown.

It should be noted that a terminal of the "Minitel" type known at present comprises mainly the change-over switch 14, modem 13, screen 12, keyboard 11, management circuit 15 and the power supply circuit 16 which have just been described. For this reason, this assembly has been combined in a single block bearing the reference 1 in the drawings. The bidirectional access of the management circuit 15 is the socket provided on the terminal for the connection of peripheral devices.

According to the invention, to this known terminal are added the circuits and devices combined in the block bearing the reference 2 in the drawings, and which will now be described.

They comprise first of all a ringing detector 21 disposed in line 3. The binary output of detector 21 is connected both to the control input of switch 4 and to a binary input of a management circuit 25.

The management circuit 25 also has a bidirectional digital access connected to connection 152, a digital input connected to a document analysis device 23, a first digital output connected to a graphic data transmission request detection circuit 29 and a second digital output connected to a conversion circuit 28.

The graphic data transmission request detection circuit 29 has a digital output connected to the input of a document printing device 24 and a binary output connected to a sound alarm circuit 27.

The conversion circuit 28 has a digital output also connected to the input of the document printing device 24. It converts data relative to characters or semi-graphic symbols such as those displayed on screen 12 into graphic data intended for the document printing device 24.

This printing device 24 here comprises a thermal printer and its associated circuits, of the type met with at present in telecopiers and having very good resolution, typically of the order of 8 points per millimeter.

A circuit 26 for supplying with power the circuit of block 2, except for the ringing detection circuit 21, is connected via a controllable switch 4 to the mains network. For the sake of simplicity, the connections between circuit 26 and the circuits it supplies have not been shown.

The terminal which has just been described operates as will now be described.

First of all the case of a communication established on the initiative of the user of the terminal is considered. In this case, he establishes the communication in the usual way and when he desires to send or receive a document by telecopier, via keyboard 11 he controls the management circuits 15 and 25 as well as circuit 29 so that they connect the analysis device 23 to the input of modem 13 or the printing device at the output of this same modem 13.

In each of these cases, the graphic data communication procedure comprises protocol phases, during which the terminal and said source exchange questions and answers in the form of data transmitted at the speed $V_1$ of 1200 bauds via modem 13 used alternately in one direction and in the other, which protocol phases enclose transfer phases, during which a flow of graphic data is transmitted at the speed $V_1$ of 1200 bauds. In the case of transmission of a document by the terminal, the addressee may regulate the flow transmitted by sending regulation data at the speed $V_1$ of 75 bauds. In the case of receiving a document by the terminal, the latter may send regulation data at 75 bauds towards the transmitter of the document. The protocol is similar to that well known in telecopying, except that, since the transfer can only take place here at a single speed of 1200 bauds, the training step is omitted. The reversal of direction of modem 13, identical to that which takes place in known terminals, is controlled by circuit 15 in a way not shown for the sake of simplicity.

Figure 2:
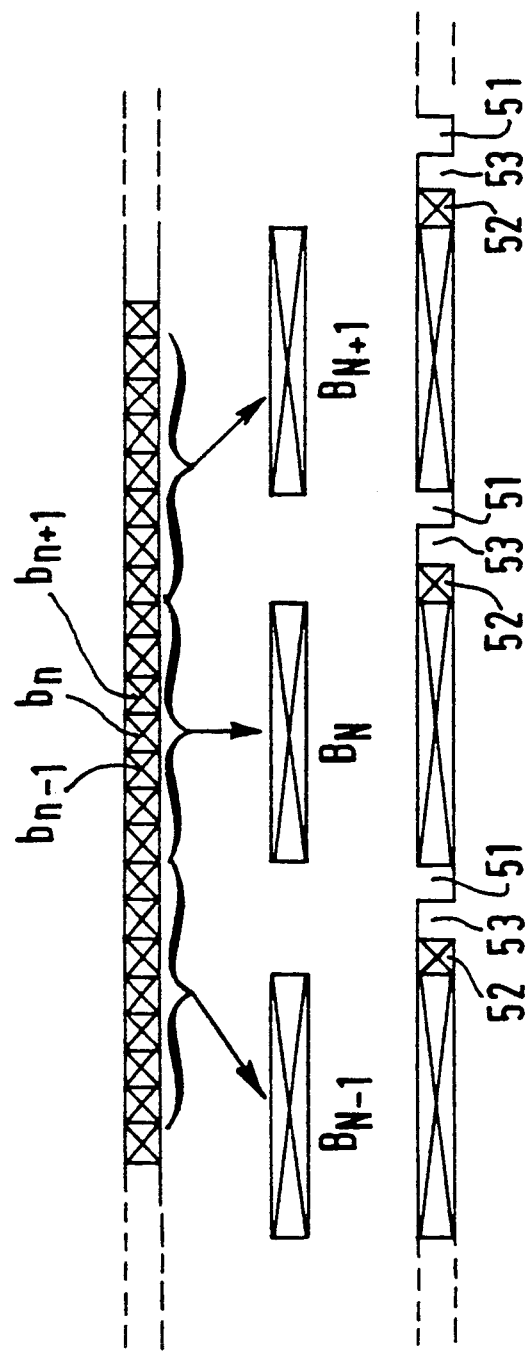
FIG. 2 is an explanatory diagram of the method of data transmission by the modem of the terminal of FIG. 1.

As shown in FIG. 2, the graphic data to be transmitted is in the form of a succession of binary elements $\ldots b_{n-1}, b_n, b_{n+1}, \ldots$ resulting from the pixel by pixel analysis of the image to be transmitted and compression of the data resulting from such analysis, which is carried out in a way known in the art. Since the modem 13 and its associated circuits are here adapted for transmitting groups of 7 bits, the succession $\ldots b_{n-1}, b_n, b_{n+1}, \ldots$ is broken up into a plurality of groups of 7 bits $B_{N-1}, B_N, B_{N+1} \ldots$ and each of said groups is transmitted separately by the modem 13, preceded by a synchronization bit 51, and followed by a parity bit 52 and a stop bit 53. The succession is then recomposed for restoring the original image.

Coming back to FIG. 1, the case of communications established on the initiative of an unknown caller will be considered.

When the terminal is at rest, switch 4 is open and change-over switch 14 is in the position shown in FIG. 1, where the telephone set 5 is connected to line 3.

Only the ringing detection circuit 21 is operational. It may be fed with power by the network itself or, if necessary, by a buffer battery.

When a call arrives on the line, set 5 starts to ring, but fairly briefly, as will be better understood hereafter. The ringing signal is in fact detected in circuit 21. Switching on of the whole of the terminal results therefrom through switch 4.

The management circuit 25, via connection 152, then asks the management circuit 15 to connect the bidirectional access of modem 13 to line 3, by appropriately controlling the change-over switch 14. The hand-set 5 then ceases to ring.

Modem 13 then receives the analog signals over line 3, which signals it demodulates which are then transmitted via circuit 15, connection 152 and circuit 25, to circuit 29. The latter detects a possible graphic data transmission request by attempting to start, with the calling terminal, the protocol specific to the transmission of graphic data.

In the absence of a graphic data transmission request, circuit 29 does not succeed in starting the protocol. It is then because the call concerns a simple telephone conversation. This is why, in this case, circuit 29 controls circuit 27 so that the user, warned by the alarm, lifts the hand-set 5, connects it by actuating manually change-over switch 14 and starts the conversation.

At the end of the conversation, the user leaves the change-over switch 14 in this state and a timer, not shown for the sake of simplicity, causes switch 4 to open and the terminal is again in its rest state.

In the absence of the user, the caller, not obtaining an answer, will finish by hanging up and freeing line 3. The terminal comes back to the rest state after a certain time, change-over switch 14 being thrown to connect line 3 to the modem, which raises no particular problem.

If, on the other hand, circuit 29 succeeds in starting the protocol, it controls the printing circuit 24 so that the transmitted document is printed.

Naturally, the terminals of the type which has just been described may exchange documents between themselves and with graphic data bases which have been provided for this purpose.

If it is desired for these terminals to be able also to exchange documents with conventional type telecopiers, it is possible to provide a server which provides the protocol conversion between the terminals of the invention and conventional type telecopiers. In the case where the user of the terminal desires to call a conventional telecopier, he dials the number of the server, followed by the number of the telecopier. The server establishes communication with the telecopier and then regulates the flow of data so that transfer takes place suitably. In the case where the user of the conventional telecopier desires to transmit a document to the user of a terminal in accordance with that of the invention, he also passes through the server. With an adequate numbering plan, it is even possible to automate this procedure so that the caller does not have to worry about the nature of the apparatus which his correspondent possesses. A protocol conversion box may also be added to the terminal of the invention, if the user desires to be able to communicate with conventional telecopiers without passing through the conversion server.

For recopying the "Minitel" screen, the user controls connection of the conversion circuit 28 to the output of modem 13 for converting, into graphic data, data representing characters displayed on screen 12, and printing by the printing device 24 so that it restores a copy of screen 12 in response to the converted data.

Naturally, the automatic response system which has been described is not obligatory, and documents intended for such a terminal may be addressed to a receiving service which the user of the terminal consults regularly.

Similarly, the document analysis device 23 is not indispensable for all users, and it may in some cases be omitted.

The thermal printing device which has been described is obviously not limitative and any printing system providing sufficient resolution may of course be used, such for example as a laser printer.

Naturally, as in a conventional type telecopier, it is possible, if the terminal is provided with an analysis device to make local copies of documents.

The terminal which has just been described is connected to the switched telephone network, but it is within the scope of a man skilled in the art to modify it for connection to a digital network such as the integrated services digital network I.S.D.N.

In the description which has just been given, for the sake of clarity, separate blocks have been shown for each of the important functions provided in the terminal of the invention. It is obvious that, in practice, a single computing circuit, for example a microprocessor, may alone assume a number of such functions. Programming of such a microprocessor, as well as the design of the circuits whose operation has just been described is within the scope of a man skilled in the art.

Figure 3:
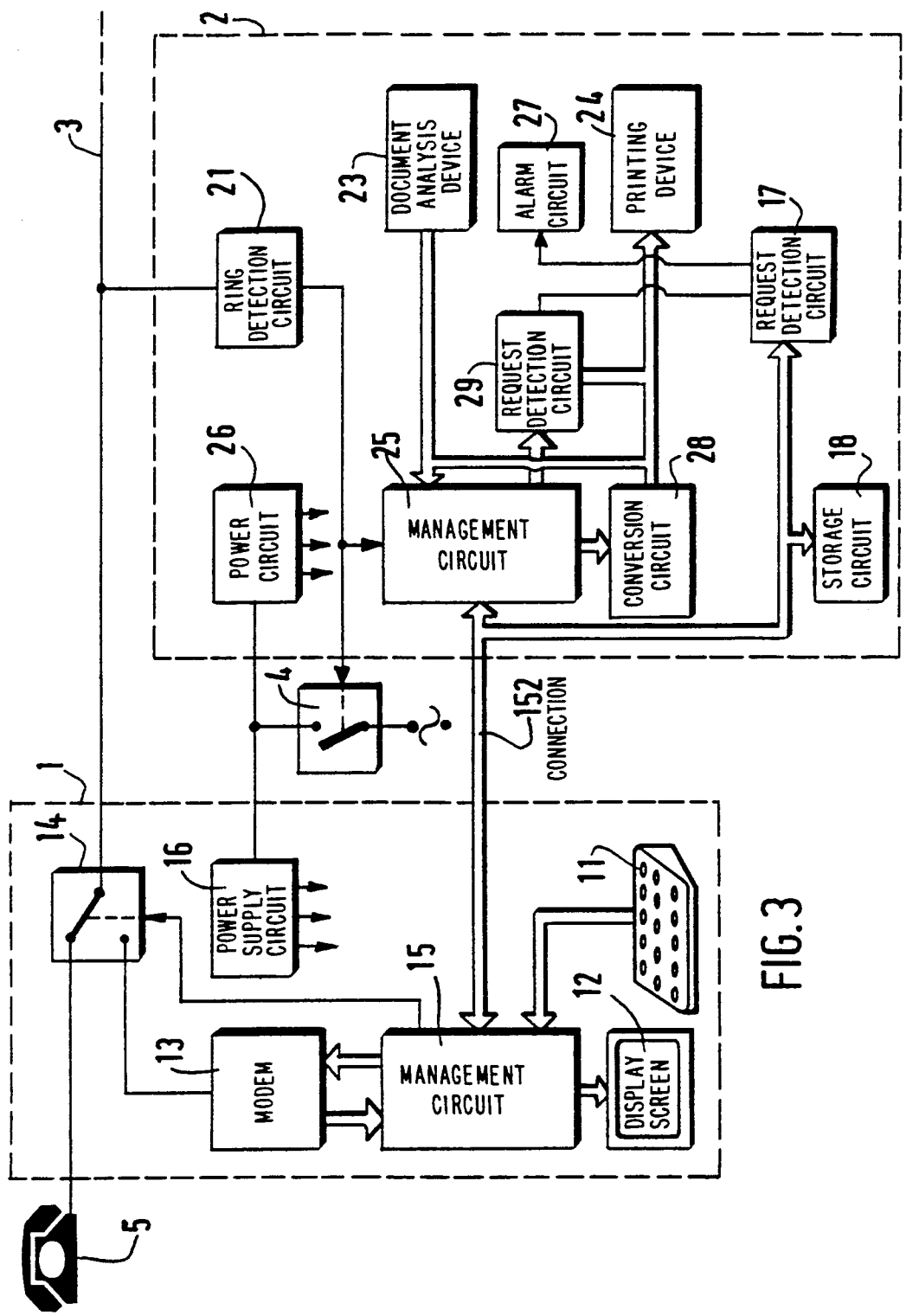
FIG. 3 shows a block diagram of the second embodiment of the terminal of the invention.

Referring now to FIG. 3, the terminal of the invention comprises, in its second embodiment, the same elements designated by the same references and arranged in the same way as in the first embodiment of FIG. 1, except that:

in block 2 a circuit 17 is provided for detecting a request for transmission of pages of characters by a videotex server, which circuit 7 has a bidirectional access connected to connection 152, a binary input and a binary output, also in block 2 a circuit 18 is provided for receiving and storing pages of characters having a bidirectional access connected to connection 152, the binary output of circuit 29 is not connected to the alarm circuit 27 but to the binary input of circuit 17, whose binary output is connected to the alarm circuit 27, and the output of circuit 28 is connected to the digital input of circuit 25 which already receives the output signal from device 23.

The device which has just been described operates as follows.

When a call arrives over the line, the terminal behaves like the terminal of the first embodiment, except that, in the absence of a graphic data transmission request, circuit 29 controls circuit 17 so that the latter detects, if necessary, a request for transmission of pages of characters, by trying to start with the caller a videotex protocol specific to such transmission. If circuit 17 succeeds in starting this protocol, via connection 52, it controls for example the reception and storage circuit 18 so that the latter receives and stores these pages of characters, which the user may consult subsequently.

In the absence of a request for transmission of pages of characters, circuit 17 controls the alarm circuit 27 so that the user, warned by the alarm, lifts the handset 5, connects it by actuating the change-over switch 14 and starts the conversation. The succession of operations is the same as in the terminal of the parent patent.

The reception and storage circuit 18 is not obligatory in the case where it is advantageously provided for the pages of characters, transmitted by the server, to be printed by the printing device 24. Thus, the automatic delivery of videotex data by a server is possible, without a storage circuit such as circuit 18. In this case it is the printing device 24 itself which is used for receiving the pages of characters.

For "Minitel" screen recopying, as in the case of the terminal of the parent patent, the user controls connection of the conversion circuit 28 to the output of modem 13, for converting, into graphic data, data representing characters displayed on screen 12 and printing by the printing device 24 so that it restores a copy of the screen 12 in response to the converted data. It is also possible, because the output of circuit 28 is connected to circuit 25, to transmit this graphic data for restoring said characters at a distance, by a telecopier or by another terminal of the type of that of the invention.

What is claimed is:

1. A videotex terminal which can be connected to a telephone network for asking for and receiving pages of characters from a server center also connected to said network, and comprising:
    a control keyboard,
    a display screen, and
    a modem with an input connected to the keyboard, an output connected to said screen and a bidirectional access connectable to a telephone line of said network, said modem being normally provided for transmitting data from said center at a first speed and data towards said center at a second speed, in which terminal are provided:
    means connected to the output of said modem, for printing fixed images in response to first graphic data from a source such as a graphic server center or a telecopier connected to said network, and
    means for controlling procedures for communicating said first graphic data and videotex characters whereby at least one procedure for communicating comprises protocol phases during which said terminal and said source exchange questions and answers in the form of data transmitted at said first speed via the modem used alternately in one direction and in the other, and transfer phases, during which a flow of first graphic data is transmitted by said modem, at said first speed, from the source to said terminal and data for regulating said flow is transmitted by said modem, at said second speed, from said terminal to said source.

2. The terminal as claimed in claim 1, further comprising the following:
    means for detecting a call, disposed in said telephone line,
    means for connecting said telephone line to said modem access, in response to a detected call,
    alarm means,
    and means, connected to the output of said modem, for detecting a first graphic data transmission request, and for controlling, in the case of a first graphic data transmission request, said printing means and, in the absence of detection of a first graphic data transmission request, said alarm means.

3. The terminal as claimed in claim 1, wherein
    means are provided, connected to said modem output, for converting, into graphic data, data representing videotex characters to be displayed on said screen and for controlling said printing means to reproduce a copy of said screen in response to the converted data.

4. The terminal as claimed in claim 1, wherein
    means are provided for analyzing fixed images, having an output connected to said modem input and delivering second graphic data for transmitting said second graphic data for remotely reproducing fixed analyzed images whereby procedure for communicating said second graphic data is identical to said at least one procedure for communicating, with reversal of the direction of said modem.

5. The terminal as claimed in claim 1, wherein
    switching means are provided for switching off the electric power supply to said terminal during rest periods of said terminal, except for said call detection means, said switching means being controlled by said call detection means to re-establish the electric power supply in response to a call detection.

6. The terminal as claimed in claim 1, wherein
    the graphic data to be transmitted is in the form of a succession of binary elements resulting from the pixel by pixel analysis of the image to be transmitted, said succession is broken up into a plurality of groups of binary elements, each of said groups is transmitted separately by the modem and said succession is recomposed after transmission in the modem for reproducing said fixed image.

7. The terminal as claimed in claim 1, further comprising:
   call detection means, disposed in said telephone line,
   means for connecting said telephone line to said modem access, in response to a detected call,
   means, connected to the output of said modem, for detecting a first graphic data transmission request and controlling, in the case of a first graphic data transmission request, said printing means so that they print said first graphic data,
   alarm means, and
   means connected to the output of said modem for, in the absence of a first graphic data transmission request, detecting a request for transmission of pages of videotex characters and controlling, in the case of a request for the transmission of pages of characters, means for receiving these pages of characters and for controlling said alarm means in the absence of a request for the transmission of pages of characters.

8. The terminal as claimed in claim 7, wherein said means for receiving pages of videotex characters comprise said printing means.

9. The terminal as claimed in claim 7, wherein means are provided, connected to the output of said modem, for converting, into graphic data, data representing characters to be displayed on said screen and for transmitting said graphic data for remote reproduction of said characters.

* * * * *